(12) United States Patent
Gambhir et al.

(10) Patent No.: US 12,255,962 B2
(45) Date of Patent: Mar. 18, 2025

(54) MACHINE LEARNING FOR IDENTIFYING IDLE SESSIONS

(71) Applicant: Microsoft Technology Licensing, LLC, Redmond, WA (US)

(72) Inventors: Prerana Dharmesh Gambhir, San Jose, CA (US); Sharena Meena Pari-Monasch, Union City, CA (US); Khoa Dang Nguyen, Murphy, TX (US); Yiming Shi, Milpitas, CA (US); Yongchang Dong, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/962,078

(22) Filed: Oct. 7, 2022

(65) Prior Publication Data
US 2024/0121311 A1 Apr. 11, 2024

(51) Int. Cl.
*H04L 67/143* (2022.01)
*H04L 67/54* (2022.01)

(52) U.S. Cl.
CPC ............ *H04L 67/143* (2013.01); *H04L 67/54* (2022.05)

(58) Field of Classification Search
CPC .............................. H04L 67/143; H04L 67/54
See application file for complete search history.

(56) References Cited

U.S. PATENT DOCUMENTS 10,755,033 B1 * 8/2020 Dass ...................... G06F 40/258
11,163,618 B1 * 11/2021 Wei ......................... G06F 16/16
11,550,645 B2 * 1/2023 Wei ........................... G06F 9/544
2016/0234268 A1 * 8/2016 Ouyang ................... H04L 67/54
2020/0099753 A1 * 3/2020 Fleck ..................... H04L 67/145

FOREIGN PATENT DOCUMENTS

WO 2018013277 A1 1/2018

OTHER PUBLICATIONS

Labayen et al. "Online classification of user activities using machine learning on network traffic", https://www.sciencedirect.com/science/article/pii/S1389128620312081#bib0006 (Year: 2020).*
Anonymous, "Introducing Amazon EC2 Resource Optimization Recommendations", AWS, Retrieved from the Internet: URL: https://aws.amazon.com/about-aws/whats-flew/2019/07/introducing-amazon-ec2-resource -optimization-recommendations/, Jul. 23, 2019, 1 page.
International Search Report and Written Opinion received for PCT Application No. PCT/US23/031445, mailed on Dec. 13, 2023, 15 pages.

* cited by examiner

*Primary Examiner* — James E Springer
*Assistant Examiner* — Patrick F Ngankam
(74) *Attorney, Agent, or Firm* — NovoTechIP International PLLC

(57) ABSTRACT

Systems and methods for identifying and evicting idle sessions include training a machine learning model as a session classifying model to learn rules for classifying active sessions between clients and the cloud-based service. The session classifying model is trained to receive a plurality of parameters pertaining to the document associated with an active session as input and to apply the rules to the plurality of parameters to determine a classification for the active session and to provide an output indicative of the classification for the active session. The session classifying model is then utilized in the cloud-based service to classify the active sessions. The active sessions classified as idle sessions may then be evicted from the cloud-based service.

14 Claims, 7 Drawing Sheets

MACHINE LEARNING FOR IDENTIFYING IDLE SESSIONS

BACKGROUND

Cloud-based services provide computing services over the Internet or a dedicated network. The services may include supporting a web application or other online or cloud computing services. A cloud-based service may include multiple servers for handling user requests for services, such as accessing online storage, viewing/editing online documents, consuming content, collaboration, communication, and the like. Servers are typically implemented by virtual machines hosted on one or more physical computing devices. Virtual machines are software implementations of physical computing devices that can each run programs analogous to physical computing devices. During operation, a plurality of virtual machines are typically active at the same time for handling requests for service from a plurality of different users. The plurality of active virtual machines are often referred to as a worker pool with the virtual machines themselves being referred to as workers, worker processes or worker machines. Virtual machines can be provisioned and decommissioned as needed to accommodate changes in the amount of traffic to a cloud-based service. Depending on implementations, a cloud-based service may be configured to maintain a predetermined number of virtual machines available in the worker pool to handle incoming requests without having to provision new virtual machines for each new request.

To access the services provided by a cloud-based service, an application on a client device typically opens a connection to a server of the cloud-based service and establishes what is referred to as a session. A session represents an ongoing exchange of data, messages, and the like between an application and a server. To establish a session, one or more virtual machines are assigned to the session for handling requests for service. Depending on the implementation, the virtual machine(s) assigned to a session may be taken from the worker pool and/or provisioned and added to the worker pool. In any case, the virtual machine(s) assigned to a session typically remain assigned to the session as long as the session is active, i.e., as long as requests for service are being received.

One difficulty in managing the virtual machines of a cloud-based service is maintaining an adequate number of virtual machines available to handle requests. A cloud-based service typically has a limited number of virtual machines that can be provisioned at any given time. Therefore, as the number of active virtual machines (i.e., virtual machines assigned to a session) approaches and/or reaches the limit, users may experience service slowdowns, dropped/rejected requests, or even outages. Virtual machines assigned to sessions may be considered active, but the sessions that they are assigned to may not be actively receiving requests. These sessions may be referred to as idle sessions. Virtual machine management systems typically implement some kind of process for identifying idle sessions so they can be terminated to free up virtual machines for handling other requests. In previously known systems, idle sessions are typically identified based on a predefined idle time-out period. For example, sessions that have not received a request in a predefined amount of time period may be identified as idle sessions which can then be terminated.

However, it can be difficult to determine an appropriate amount of time to use as the idle time period for sessions, particularly for web applications and web services that enable accessing, viewing and editing of online documents. In this case, if the idle time period is set to a smaller amount of time, more sessions may be identified as idle sessions which can free up more resources for handling other sessions more quickly. However, a smaller time-out period also increases the risk of terminating sessions that are in fact still active. For example, some sessions may involve reviewing or previewing a document for certain periods of time. If the idle time period expires while a user is previewing or reviewing a document, the session may time-out even though the user is still actively using the service. Conversely, if the idle time period is set to a larger amount of time, the risk of terminating active processes decreases, but this also means that fewer sessions are likely to be identified as idle sessions so resources may be freed up at a lower rate. Longer time-out periods also allow sessions that are in fact idle to continue to occupy resources that could be better utilized elsewhere.

Hence, there is a need for improved methods of identifying idle sessions for cloud-based services.

SUMMARY

In yet another general aspect, the instant disclosure presents a method for deploying virtual machines in a server farm based on capacity needs of the server farm. In some implementations, the method includes training a machine learning model as a session classifying model to learn rules for classifying active sessions between clients and the cloud-based service, each of the active sessions pertaining to a document maintained by the cloud-based service, the session classifying model being trained to receive a plurality of parameters pertaining to the document associated with an active session as input and to apply the rules to the plurality of parameters to determine a classification for the active session and to provide an output indicative of the classification for the active session; and utilizing the session classifying model in the cloud-based service to classify the active sessions in the cloud-based service by providing the plurality of parameters pertaining to the document associated with each of the active sessions to the session classifying model and using the session classifying model to apply the rules to the plurality of parameters to determine classifications for each of the active sessions; and evicting the active sessions from the cloud-based service that have been classified as idle sessions.

In yet another general aspect, the instant disclosure presents a data processing system having a processor and a memory in communication with the processor wherein the memory stores executable instructions that, when executed by the processor, cause the data processing system to perform multiple functions. The function may include utilizing a machine learning model trained as a session classifying model to assign classifications to active sessions between clients and a cloud-based service, each of the active sessions pertaining to a document maintained by the cloud-based service, the session classifying model receiving a plurality of parameters pertaining to the document associated with each of the active sessions as input and being to trained to apply rules for classifying each of the active sessions based on the plurality of parameters to determine classifications for the active sessions, the session classifying model providing outputs indicative of the classifications for the active sessions; and evicting the active sessions from the cloud-based service that have been classified as idle sessions.

In a further general aspect, the instant application describes a non-transitory computer readable medium on which are stored instructions that when executed cause a programmable device to perform functions of utilizing a machine learning model trained as a session classifying model to assign classifications to active sessions between clients and a cloud-based service, each of the active sessions pertaining to a document maintained by the cloud-based service, the session classifying model receiving a plurality of parameters pertaining to the document associated with each of the active sessions as input and being to trained to apply rules for classifying each of the active sessions based on the plurality of parameters to determine classifications for the active sessions, the session classifying model providing outputs indicative of the classifications for the active sessions; and evicting the active sessions from the cloud-based service that have been classified as idle sessions.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
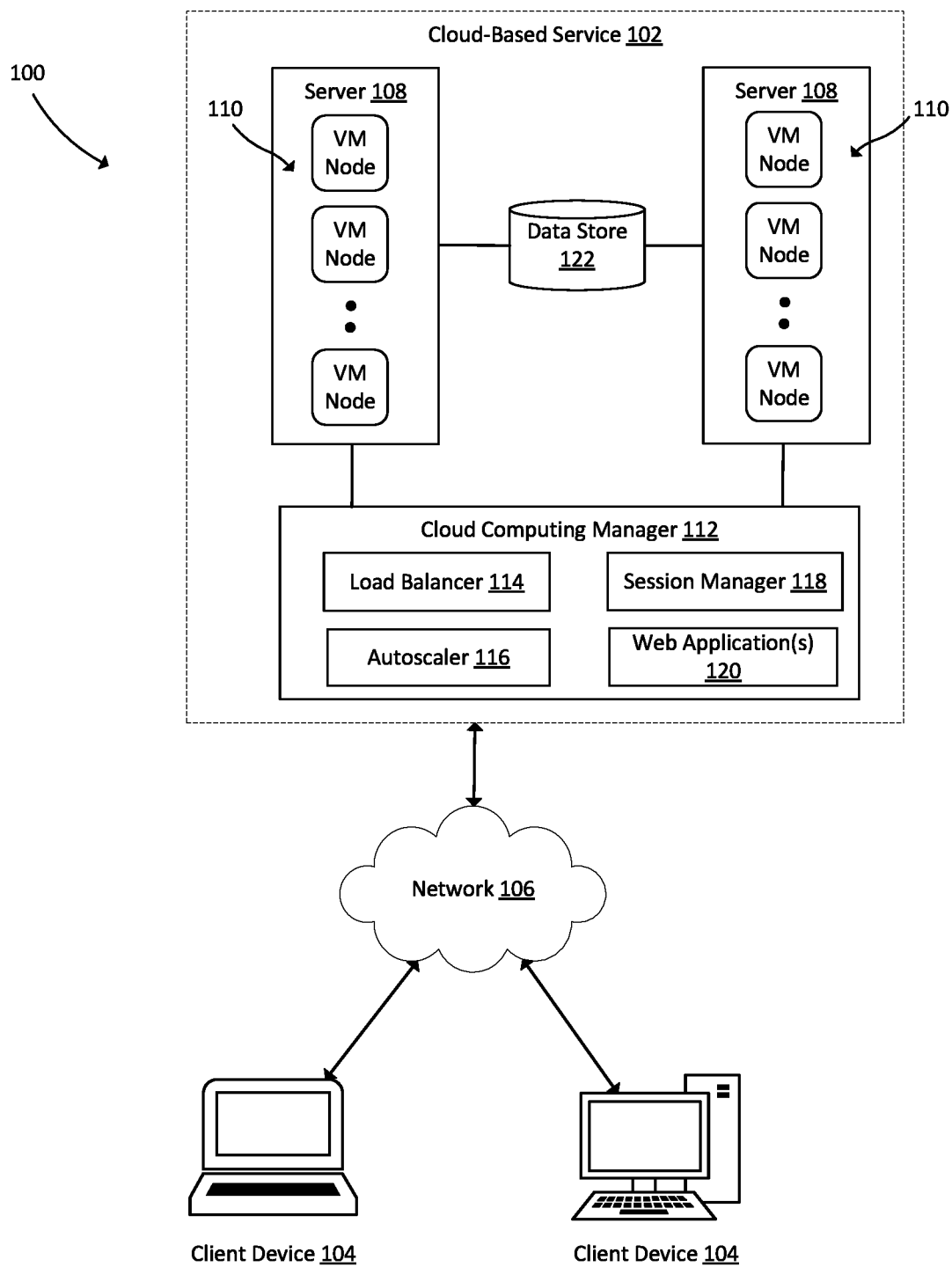
FIG. 1 depicts an example system upon which aspects of this disclosure may be implemented.

As noted above, identifying idle sessions so they can be terminated to free up resources of a cloud-based service is a problem known in the art. Previously known virtual machine management systems typically identify idle sessions based on a predefined idle time-out period. Determining the optimal amount of time to use as the idle time-out period can be problematic. If the idle time-out period is set to a smaller amount of time, more sessions may be identified as idle sessions which can free up more resources for handling other sessions more quickly while at the same time increasing the risk of terminating sessions that are in fact still active. In this case, when an active session which has been terminated prematurely (i.e., the virtual machine has been taken away) attempts to start again, a virtual machine may have to be reassigned from another session to process the sessions requests, and, if the other session is still in fact active, a virtual machine from yet another session may then have to be reassigned from another session to process requests, and so on resulting in cycle of virtual machines being frequently switched from one session to another which can adversely impact the performance of the system. If the idle time-out period is set to a larger amount of time, the risk of terminating active processes decreases which in turn results in fewer sessions being identified as idle sessions so resources may be freed up at a lower rate. Longer time-out periods also allow sessions that are in fact idle to continue to occupy resources for longer periods of time that could be better utilized elsewhere. This problem is exacerbated in some cloud-based services, such as web applications and web services that enable users to access, view, and edit documents online. For these services, a user may not be actively requesting service but may nevertheless still be actively using the service, for example, when viewing a document.

To address these technical problems and more, in an example, this description provides technical solutions in the form of a session management system having a machine learning model trained to learn rules for identifying idle sessions which can be terminated, or evicted, if needed to free up resources for a cloud-based service, particularly for web applications, web services, cloud computing environments, and the like that enable users to view and edit documents online. The machine learning model is trained to learn rules that can be applied to a plurality of different parameters pertaining to active sessions to identify idle sessions. The parameters used depend at least in part on the services being performed by the cloud-based service. For example, for a cloud-based service in the form of a web application for generating, viewing and editing documents, the parameters used to identify idle processes may be parameters of the document(s) being processed during a session. In embodiments, the values of these parameters may be determined by accessing metadata for the file or document that is opened during a session. For example, documents may be stored in a shared online storage. The parameters may be stored as metadata in the documents themselves or in a separate data structure, such as a table or database, provided in the online storage. In other embodiments, the virtual machines may store parameter values pertaining to documents in active sessions in a shared storage.

The machine learning model receives the values of the parameters pertaining to the documents in active sessions and processes these parameters to identify idle sessions. As used herein, "idle sessions" refers to active sessions (i.e., sessions having one or more virtual machine currently assigned thereto) that currently do not have any user involvement in the session. For example, an idle session may result from a user walking away from a computing device or starting a different task on a computing device while leaving an online document open in a browser window. In embodiments, the machine learning model is also configured to identify less important sessions and to distinguish less important sessions from idle sessions. As used herein, a "less important session" refers to active sessions that appear to be idle sessions but in fact do have user involvement. For example, a less important session may result when a user opens an online document and only views the document for a period of time without editing the document or performs tasks in another application for the purpose of editing the online document. In embodiments, the management system is also trained to identify important sessions. As used herein, "important sessions" refers to sessions during which a document is actively and/or frequently being edited.

Evicting, or terminating, a session, ends the process(es) associated with the session and frees the virtual machine(s) (sometimes referred to as Unified Worker(s) or worker(s)) assigned to the session to return to the worker pool and be assigned to other sessions. Evicting sessions identified as idle sessions will likely have limited to no impact on user experience as a user may not even be aware that the session was terminated or that the session was even still active to begin with. Evicting sessions identified as less important sessions will have limited impact on user experience as terminating a session typically results in an auto-refresh of the application, e.g., the browser. Since less important sessions involve only passive user activity, such as viewing a document, refreshing the application will be a minor inconvenience. Evicting important sessions, however, would be disruptive to a user as current edits may not have been synchronized such that refreshing or reloading the application could result in the loss of data and the frustration that comes with it. It is an object of the session management system described herein to avoid evicting important sessions. The systems and methods described herein prioritize virtual machines for active session requests as opposed to idle or less important session requests so a higher number of active users may be served and traffic can be managed more efficiently.

The technical solutions described herein address the technical problem associated with previously known session management systems for cloud-based services in that idle processes may be identified more accurately based on a number of different parameters so that more sessions may be identified as idle sessions in a minimal amount of idle time while also minimizing the risk of evicting, or terminating, active or important sessions. This in turn improves the availability of virtual machines for handling more sessions. As a result, the user experience is improved, and the resources of the system are used more efficiently.

FIG. 1 shows an example computing environment 100, upon which aspects of this disclosure may be implemented. The computing environment 100 includes a cloud-based service 102, clients 104 and a network 106. Cloud-based service 102 includes one or more servers 108 configured to provide one or more services or applications to clients 104. In embodiments, the services include an online document storage, viewing and editing service. To this end, the cloud-based service 102 includes a data store 122 for storing documents, and one or more web applications 120 that may be utilized to access, create, view and edit documents in the data store 122.

Clients 104 enable users to request access to the services and web applications 120 offered by the cloud-based service 102. To this end, clients 104 include client applications for connecting the cloud-based service and that enable documents in data store 122 to be accessed, viewed, and/or edited. Clients 104 may comprise any suitable type of computing device that enables a user to interact with various applications. Examples of suitable computing devices include but are not limited to personal computers, desktop computers, laptop computers, mobile telephones, smart phones, tablets, phablets, smart watches, wearable computers, gaming devices/computers, televisions, and the like. Clients 104 and cloud-base service 102 communicate via network 106. Network 106 may include one or more wired/wireless communication links and/or communication networks, such as a PAN (personal area network), a LAN (local area network), a WAN (wide area network), or a combination of networks, such as the Internet.

Servers 108 may be organized in farms, clusters, racks, containers, data centers, geographically disperse facilities, and the like, and may communicate with each other via a variety of types of networks. Two servers 108 are shown as part of the cloud-based service 102 of FIG. 1 although in implementations any suitable number of servers may be utilized. Each server 108 includes one or more virtual machine (VM) nodes 110 that provide computing resources for handling sessions with clients 104 and processing requests in connections with the sessions. The servers 108 may include any suitable number of VM nodes 110.

Cloud-based service 102 includes a cloud computing manager 112 for managing resources, such as VM nodes 110, of the cloud-based service 102. As such, the cloud computing manager 112 may be used for deploying, configuring and/or managing servers 108 and/or VM nodes 110 of the system 100. The cloud computing manager 112 may be implemented in one or more computing devices which may be part of or separate from the servers. In embodiments, cloud computing manager 112 may be configured to implement a load balancer 114 for receiving requests from clients and directing requests to the appropriate server 108 or node 110. The load balancer 114 may utilize parameters such as load, number of connections, and overall performance to determine which server 108 and/or node 110 receives a client request.

Cloud computing system 112 may also include an autoscaler 116 for adjusting the number of available computational resources, e.g., VM nodes 110, in the cloud computing system 112 automatically based on the load or demand on the system. Autoscaler 116 may be configured to monitor one or more metrics indicative of the load on the cloud computing system 112, such as processor usage, memory usage, number of connections, and the like, and then scale the resources accordingly. When the load or traffic to the system is high, autoscaler 116 may provision additional VM nodes 110 so that more requests may be handled in a shorter amount of time. At times of reduced loads on the system, autoscaler 116 may be configured shut down VM nodes 110 which are being underutilized.

Cloud also includes a session manager 118 in accordance with this disclosure. The session manager 118 is configured to manage sessions established between clients 104 and the cloud-based service 102. The session manager 118 may be configured to establish sessions, terminate sessions, and assign VM nodes 110 to sessions. As discussed below, the session manager 118 includes a session classifying model (explained in more detail below) trained to classify active sessions as idle sessions, less important sessions, and/or important sessions based on a plurality of parameters pertaining to the documents around which the active sessions are based.

Figure 2:
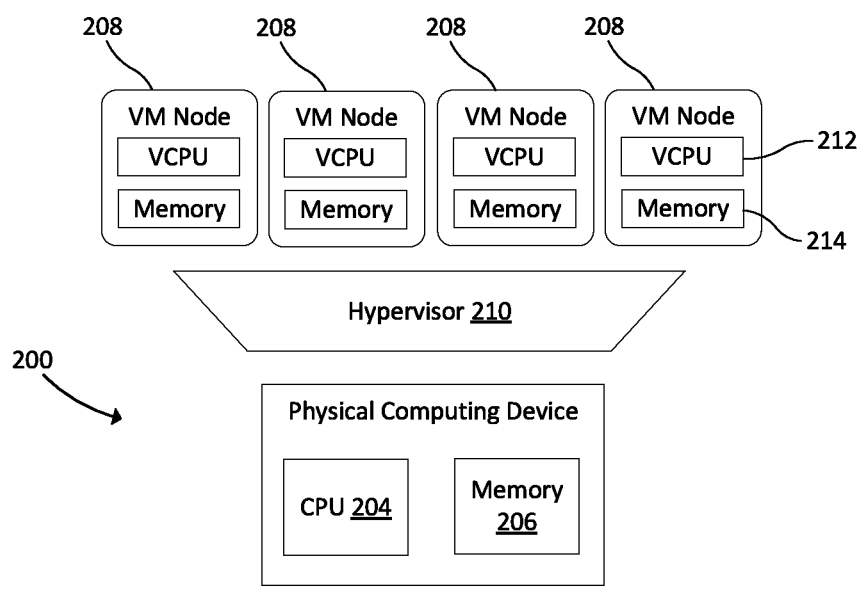
FIG. 2 shows an example of a computing device for implementing virtual machine nodes for a cloud computing system, such as the cloud computing system of FIG. 1.

Each server 108 may include one or more physical computing devices for hosting the VM nodes 110 of the server 108. FIG. 2 shows an example of such a computing device. Computing device 200 of FIG. 2 may be any of a variety of different types of computing device. For example, computing device 200 may be a desktop computer, a server computer, a laptop, and the like. Computing device 200 includes physical resources, such as a central processing unit (CPU) 204 and memory 206. Computing device 200 may include other components not shown, such as network interface devices, disk storage, input/output devices, and the like. The CPU 204 may be any type or brand of CPU. The memory 206 may include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the CPU 204. Though computing device 200 is shown as having only one CPU 204 and one memory 206, a computing device may include any suitable number of processors and/or memories.

Computing device 200 is a host device, and, as such, is configured to host one or more virtual machine nodes 208. To this end, computing device 200 includes a hypervisor 210 configured to generate, monitor, terminate, and/or otherwise manage VM nodes 208. Hypervisor 210 is software, firmware and/or hardware that emulates virtual resources for the VM nodes 208 using the physical resources 204, 206 of the computing device 200. More specifically, hypervisors 210 allocate processor time, memory, and disk storage space for each VM node 208. The hypervisor 210 also provides isolation between the VM nodes 208 such that each VM node 208 can include its own operation system and run its own programs.

VM nodes 208 are software implementations of physical computing devices that can each run programs analogous to physical computing devices. Each VM node 208 may include virtual resources, such as virtual processor (VCPU) 212 and virtual memory 214 and may be configured to implement a guest operating system. The VCPU 212 is implemented as software with associated state information that provide a representation of a physical processor with a specific architecture. Different VM nodes 208 may be configured to emulate different types of processors. For example, one VM node may have a virtual processor having characteristics of an Intel x86 processor, whereas another virtual machine node may have the characteristics of a PowerPC processor. Guest operating system may be any operating system such as, for example, operating systems from Microsoft®, Apple®, Unix, Linux, and the like. Guest operating system may include user/kernel modes of operation and may have kernels that can include schedulers, memory managers, etc. Each guest operating system may have associated file systems implemented in virtual memory and may schedule threads for executing applications on the virtual processors. Applications may include applications for processing client requests and/or implementing functionality of the server.

The hypervisor 210 enables multiple VM nodes 208 to be implemented on computing device 200 by allocating portions of the physical resources 204, 206 of the computing devices 200, such as processing time, memory, and disk storage space, to each VM node 208. Hypervisor 210 may be configured to implement any suitable number of VM nodes 208 on the computing device 200. The hypervisor 210 of FIG. 2 is shown has having instantiated five VM nodes 208 although computing devices are generally capable of supporting more VM nodes. Hypervisor may be configured to instantiate any suitable number of VM nodes 208 on computing device 200 depending on various factors, such as hardware configuration, software configuration, application, and the like.

Figure 3:
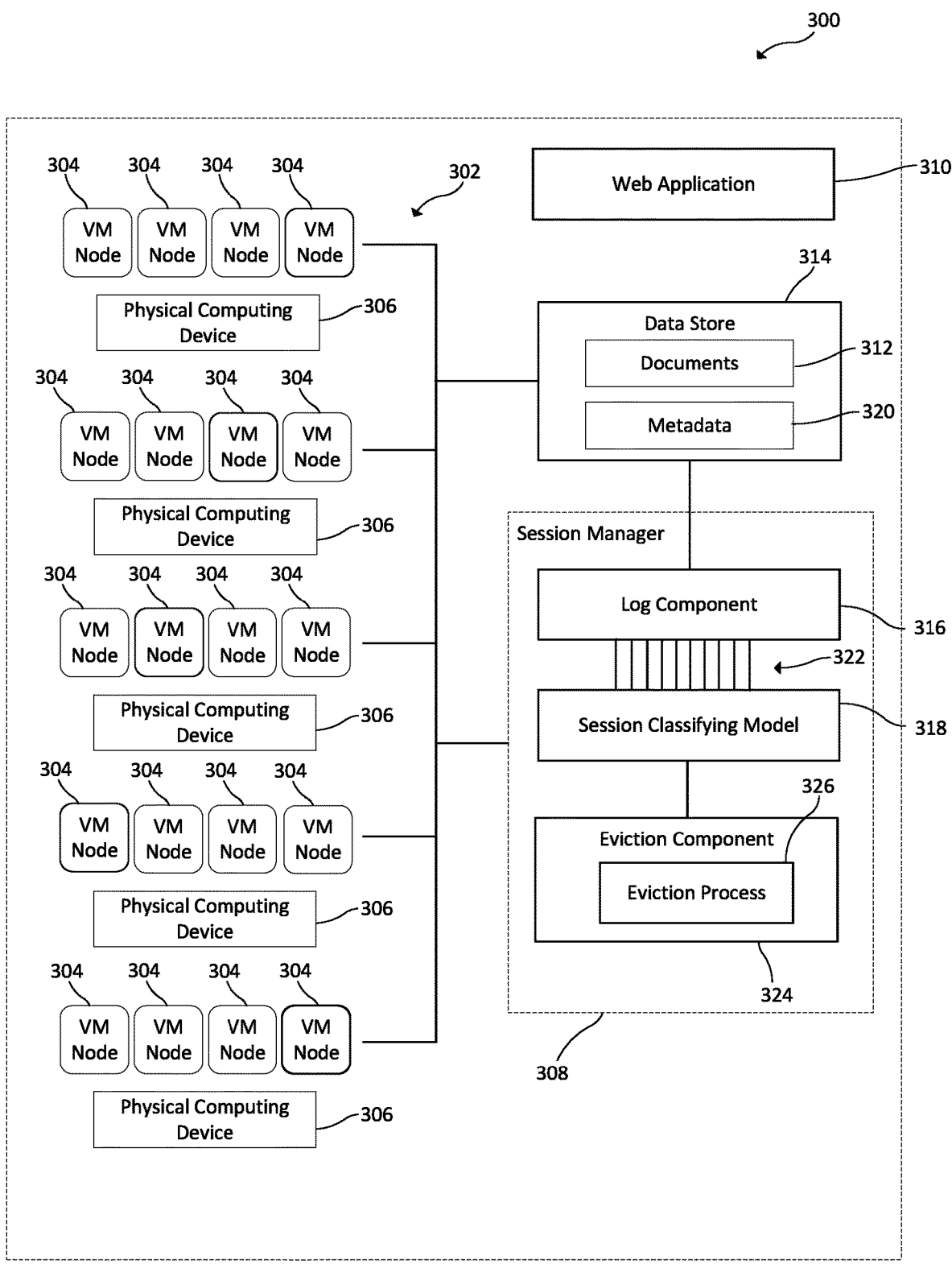
FIG. 3 shows an example implementation of a cloud-based service including a session manager in accordance with this disclosure.

FIG. 3 shows an example implementation of a session manager for a cloud-based service 300. The cloud-based service 300 includes a group 302 of VM nodes 304. The group 302 of VM nodes 304 may implement one or more servers, server farms, server clusters, data centers, cloud services, and/or any other grouping of VMs for handling sessions with clients and processing requests in association with the service(s) offered by cloud-based service 300. The cloud-based service 300 includes a plurality of physical computing devices 306 for hosting the group 302 of VM nodes 304. In the embodiment of FIG. 3, five computing devices 306 are shown with each device having four VM nodes 304. In embodiments, more or fewer computing devices may be used, and each computing device may be configured to host any suitable number of VMs.

In the embodiment of FIG. 3, the cloud-based service 300 provides a document storage service that enables clients to access documents 312 in a data store 314. Documents 312 may be any type of document, such as a text document, spreadsheet document, presentation document, and the like. Web application 310 enables clients to view and/or edit documents from the data store and create documents for storage in the data store. As such, web application 310 may be a word processing application, spreadsheet application, presentation application, meeting application, notetaking application, etc. Clients may include a client application, such as a web browser, that enables users to interact with the web application 310 and process documents in the data store.

The group 302 of VM nodes 304 may serve as a worker pool. Initially, a predetermined number of VM nodes 304 may be provisioned for the worker pool so that there are VM nodes 304 available and on stand-by for handling sessions from clients. When the cloud-based service 300 receives a request to establish a session, e.g., by requesting access to a document 312 in the data store 314, the session manager 308 assigns one or more VM nodes 304 to the session to process requests in connection with the session, such as opening a document, editing the document, formatting the document, saving the document, and the like. The session manager 308 monitors a number of parameters pertaining to the VM nodes and the sessions, such as which VM nodes are active (i.e., assigned to a session), which VM nodes are inactive (i.e., not assigned to a session), the VM nodes assigned to each session, the current number of VM nodes in the pool, the maximum number of VM nodes in the pool, etc.

The session manager 308 includes a log component 316 for monitoring and recording a plurality of parameters pertaining to the documents associated with each active session. The parameters monitored and recorded by the log component 316 include at least time-since-last-call (e.g., time since a document function was last called), time-since-last-edit (e.g., time since the document was last edited), time-since-last-merge (e.g., time since document was last merged), file type, file size, number of active authors, number of total authors, undo counts (e.g., number of times a document change was undone), time-to-open-file (e.g. amount of time required to open file), time-file-last-edit (e.g., time since the document was last edited), time-file-created (e.g., time since the file was created, timestamp), file-fully-rendered (e.g., file completely loaded on a display screen, value may be True or False), and Worker-Dictionary Contains ID. The ID refers to a unique identifier assigned to each worker (e.g., virtual machine) when it is created, and the worker dictionary refers to the data structure that is used to track the IDs of the workers that have been created. In embodiments, user interactions with a client device may be used as an indication of idle sessions. For example, user input, such as mouse scrolls, keyboard inputs, and the like, may be used as an indicator of active/idle sessions. In some embodiments, eye movement and/or gaze direction tracking may be used to indicate active/idle sessions by determining whether a user is looking at the screen or away from the screen.

In embodiments, the values of these parameters may be determined by accessing metadata for the file or document that is opened during a session. For example, log component 316 may have access to metadata 320 stored in data store 314 for the documents 312. The metadata 320 may be stored in the documents 312 themselves or in a separate data structure, such as a table or database, provided in the data store 314. In other embodiments, the VM nodes 304 may store the metadata 320 for the documents in the data store 314.

The session manager 308 includes a session classifying model 318 that has been trained to learn rules for identifying active sessions as idle sessions, less important sessions, and/or important sessions. For each active session, the session classifying model receives the plurality of parameters 322 pertaining to the document being processed during the session and applies the learned rules to the plurality of parameters to identify/classify the session. The parameters may be processed by the session classifying model in a number of ways to identify idle sessions and less important sessions. For example, the session classifying model 318 may be trained to learn rules and/or threshold values to apply to the different parameters to identify idle sessions. For example, idle sessions may be indicated by the time-since-last-call value, the time-since-last-edit value, the time-since-last-merge value, the time-file last edited value, and/or the time-file-created value exceeding predefined, or pre-learned, values, respectively. The file-fully-rendered parameter and the time-to-open-file parameter may be indicative of an idle session when a file or document is not fully rendered and/or takes a long time to open indicating problems with the file. Some of the parameters may be useful in identifying less important sessions and/or distinguishing less important sessions from idle sessions. For example, a less important session may be identified as having the parameter value(s) indicative of an idle session and other parameter value(s) indicative of a less important session. For example, file type may be used to identify less important sessions, as opposed to important sessions, in that certain file types are typically viewed (e.g., pdfs) indicating a less important session. File size may be indicative of less important session in that very small files may indicate less interaction with the file and very large files may indicate that the file has been completed. In either case (e.g., very small files and very large files), the file size may be indicative of the document being less important. The number of active authors/users may be indicative of whether a session is less important in that when more active authors/users are associated with a session, the session is likely a reviewing session (e.g., less important), whereas few active authors/users may be indicative of an editing session (e.g., important session). Undo counts may be indicative of less important sessions in that a low number of undo's indicate less interaction with the file. Combinations of different parameters may also be used to identify idle sessions and/or less important sessions. For example, when a file size is large, e.g., greater than 100 MB, and the number of users involved is high, e.g., 10 or greater, the session is more likely to be a viewing session as opposed to an edit session and may be classified as less important. Conversely, when file size is smaller and a small number of users are involved, the session is more likely to be an editing session and may be classified as an important session.

Figure 4:
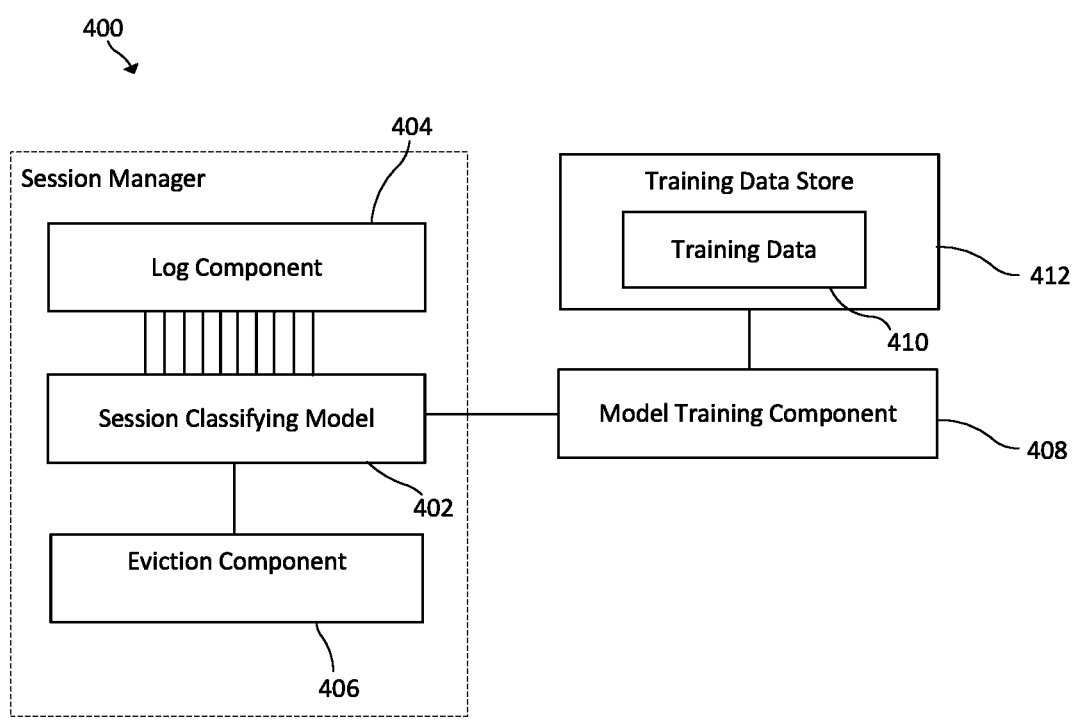
FIG. 4 shows an example implementation of a session manager including a model training component.

In embodiments, the session classifying model 318 comprises a machine learning (ML) model trained to classify sessions based on the plurality of parameters. FIG. 4 shows an implementation of a session manager 400 including a model training system for training the session classifying model. The session manager 400 includes a session classifying model 402, a log component 404 and an eviction component 406. A model training component 408 is configured to train the session classifying model 402 using training data 410 stored in a training data store 412 to provide initial and ongoing training for the session classifying model 402. The training data 410 may be based on parameter information from sessions which have been identified and/or created as examples of idle sessions and less important sessions. The session classifying model 402 may implement any suitable machine learning algorithm (MLA) for classifying sessions, such as decision trees, random decision forests, neural networks, deep learning (for example, convolutional neural networks), support vector machines, regression (for example, support vector regression, Bayesian linear regression, or Gaussian process regression). In embodiments, the session classifying model 402 may be updated to process new parameters pertaining to active sessions. All that is required is that the training data 410 be updated to include training data with the new parameter information. The session classifying model 402 can then be retrained with the updated training data.

Returning to FIG. 3, once the session classifying model 318 has classified sessions as idle sessions and/or as less important sessions, the session manager includes an eviction component 324 for evicting idle sessions and/or less important sessions to free up resources for the cloud-based service 300. In embodiments, the eviction component 324 may perform an eviction process 326 to evict idle sessions and/or less important sessions, e.g., by killing processes/requests associated with the virtual machines assigned to the session. In some embodiments, the eviction process 326 may result in only idle sessions being evicted. In other embodiments, the eviction process 326 may result in both idle sessions and less important sessions being evicted. These sessions may be evicted in order of priority. For example, idle sessions may be evicted first followed by less important sessions. In embodiments, the eviction process 326 is run continuously to evict idle sessions and/or less important sessions as they are identified. In other embodiments, the eviction process may be performed depending on one or more threshold values. For example, the eviction process 326 may be performed when the overall utilization of the cloud-based service 300 exceeds a threshold value, e.g., 80%. In embodiments, the eviction process 326 may set different thresholds for evicting idle processes and less important processes, respectively. For example, the eviction process may evict idle sessions when the utilization exceeds a first threshold value and evict less important sessions when the utilization exceeds a second threshold value. In yet another embodiment, the eviction process 326 may evict idle sessions regardless of utilization and evict less important sessions when the utilization exceeds a threshold value.

Figure 5:
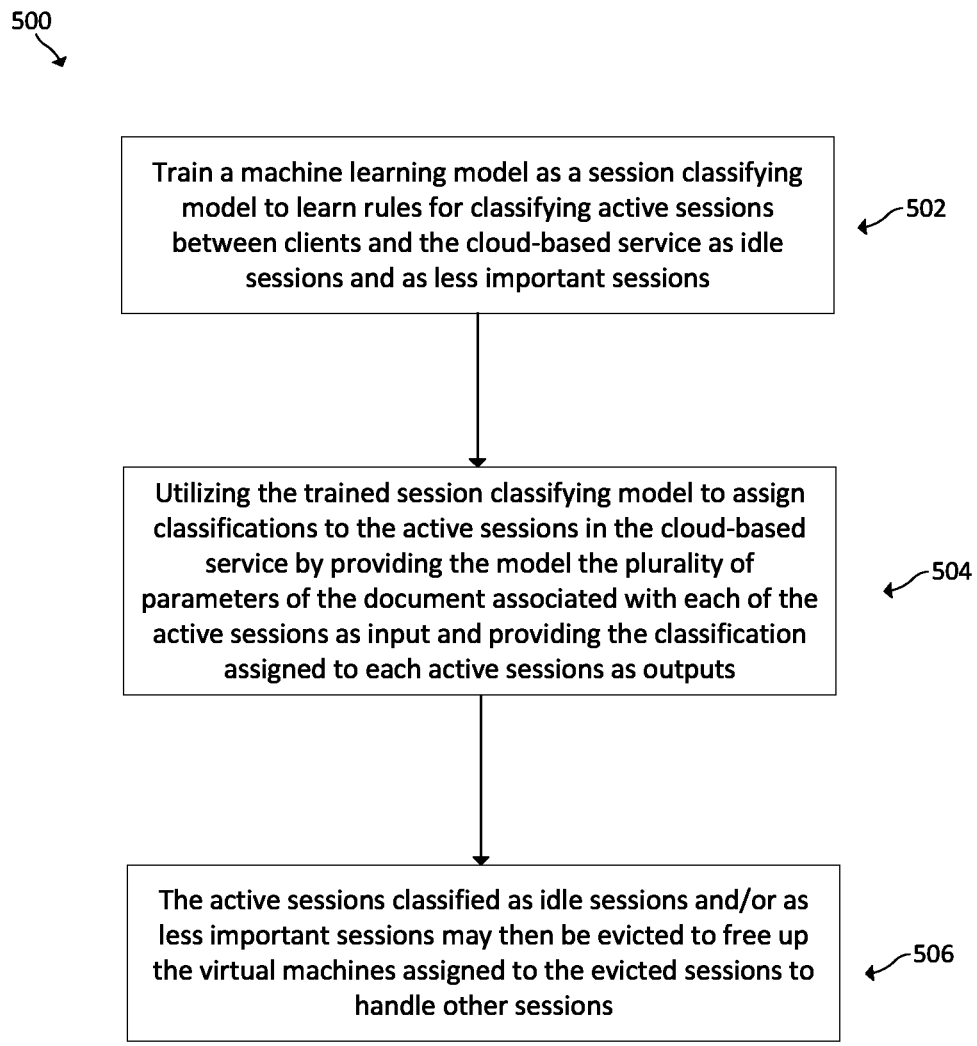
FIG. 5 shows a flowchart of an example method of classifying and evicting sessions using a session classifying model, such as shown in FIGS. 3 and 4.

A flowchart of an example method 500 of identifying and evicting idle sessions for a cloud-based service is shown in FIG. 5. The method begins with training a machine learning model as a session classifying model to learn rules for classifying active sessions between clients and the cloud-based service (block 502). As noted above, each of the active sessions pertains to a document maintained by the cloud-based service. The session classifying model is trained using training data to learn the rules for identifying idle session and/or less important sessions from among the active sessions. The session classifying model receives a plurality of parameters pertaining to the document associated with an active session as input and applies the rules to the plurality of parameters to determine a classification for the active session and provide an output indicative of the classification for the active session. Once trained, the session classifying model is then utilized in the cloud-based service to classify the active sessions by providing the plurality of parameters pertaining to the document associated with each of the active sessions to the session classifying model and using the session classifying model to assign a classification to each of the active sessions (block 504). The active sessions identified as idles sessions and/or as less important sessions may then be evicted to release the virtual machines assigned the evicted sessions to handle other sessions (block 506).

Figure 6:
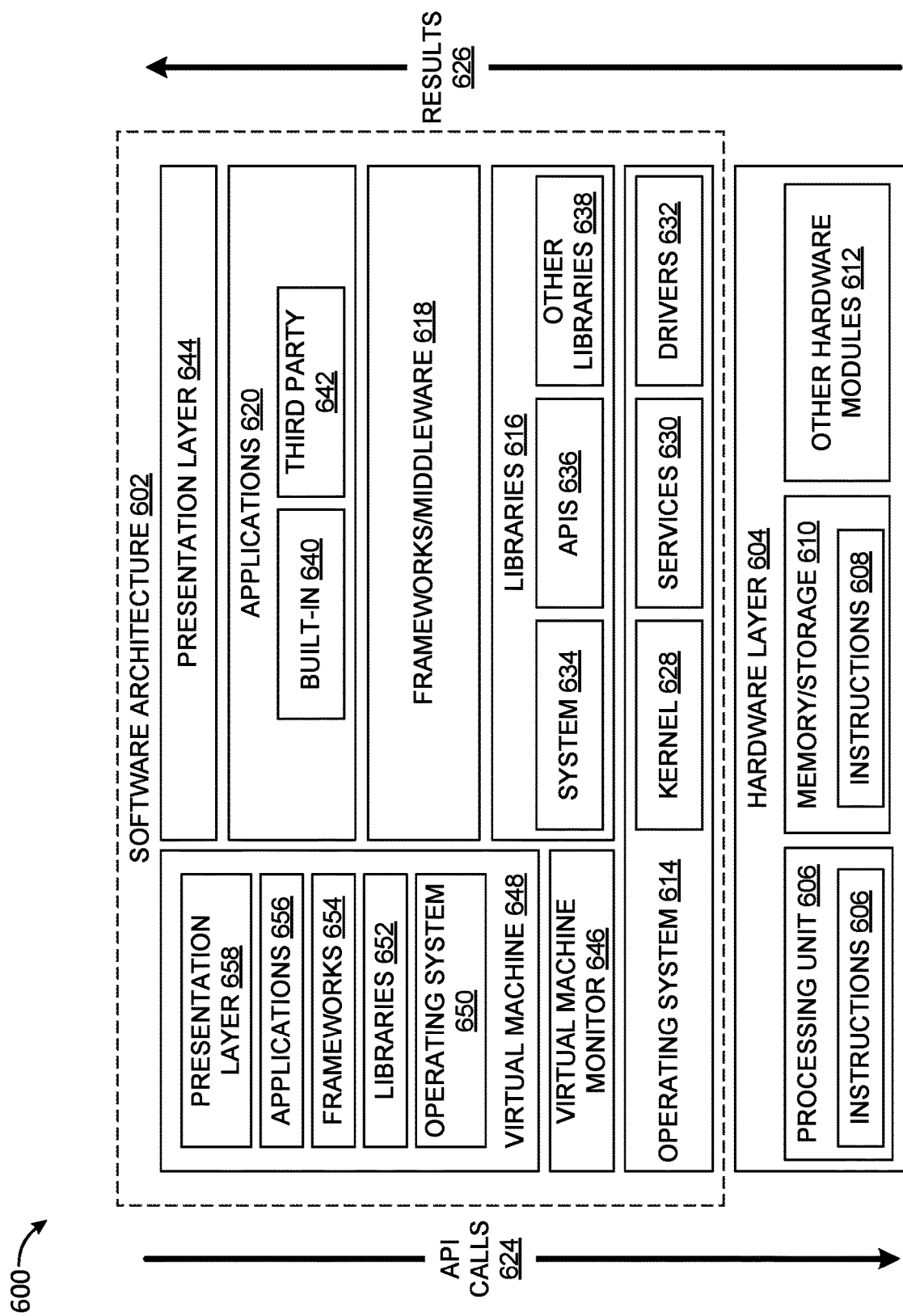
FIG. 6 is a block diagram showing an example software architecture, various portions of which may be used in conjunction with various hardware architectures herein described, which may implement any of the described features.

FIG. 6 is a block diagram 600 illustrating an example software architecture 602, various portions of which may be used in conjunction with various hardware architectures herein described, which may implement any of the above-described features. FIG. 6 is a non-limiting example of a software architecture, and it will be appreciated that many other architectures may be implemented to facilitate the functionality described herein. The software architecture 602 may execute on hardware such as a machine 700 of FIG. 7 that includes, among other things, processors 710, memory 730, and input/output (I/O) components 750. A representative hardware layer 604 is illustrated and can represent, for example, the machine 700 of FIG. 7. The representative hardware layer 604 includes a processing unit 606 and associated executable instructions 608. The executable instructions 608 represent executable instructions of the software architecture 602, including implementation of the methods, modules and so forth described herein. The hardware layer 604 also includes a memory/storage 610, which also includes the executable instructions 608 and accompanying data. The hardware layer 604 may also include other hardware modules 612. Instructions 608 held by processing unit 606 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 644. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 640 and/or third-party applications 642. Examples of built-in applications 640 may include, but are not limited to, a contacts application, a browser application, a location application, a media application, a messaging application, and/or a game application. Third-party applications 642 may include any applications developed by an entity other than the vendor of the particular platform. The applications 620 may use functions available via OS 614, libraries 616, frameworks 618, and presentation layer 644 to create user interfaces to interact with users.

Some software architectures use virtual machines, as illustrated by a virtual machine 648. The virtual machine 648 provides an execution environment where applications/modules can execute as if they were executing on a hardware machine (such as the machine 700 of FIG. 7, for example). The virtual machine 648 may be hosted by a host OS (for example, OS 614) or hypervisor, and may have a virtual machine monitor 646 which manages operation of the virtual machine 648 and interoperation with the host operating system. A software architecture, which may be different from software architecture 602 outside of the virtual machine, executes within the virtual machine 648 such as an OS 650, libraries 652, frameworks 654, applications 656, and/or a presentation layer 658.

Figure 7:
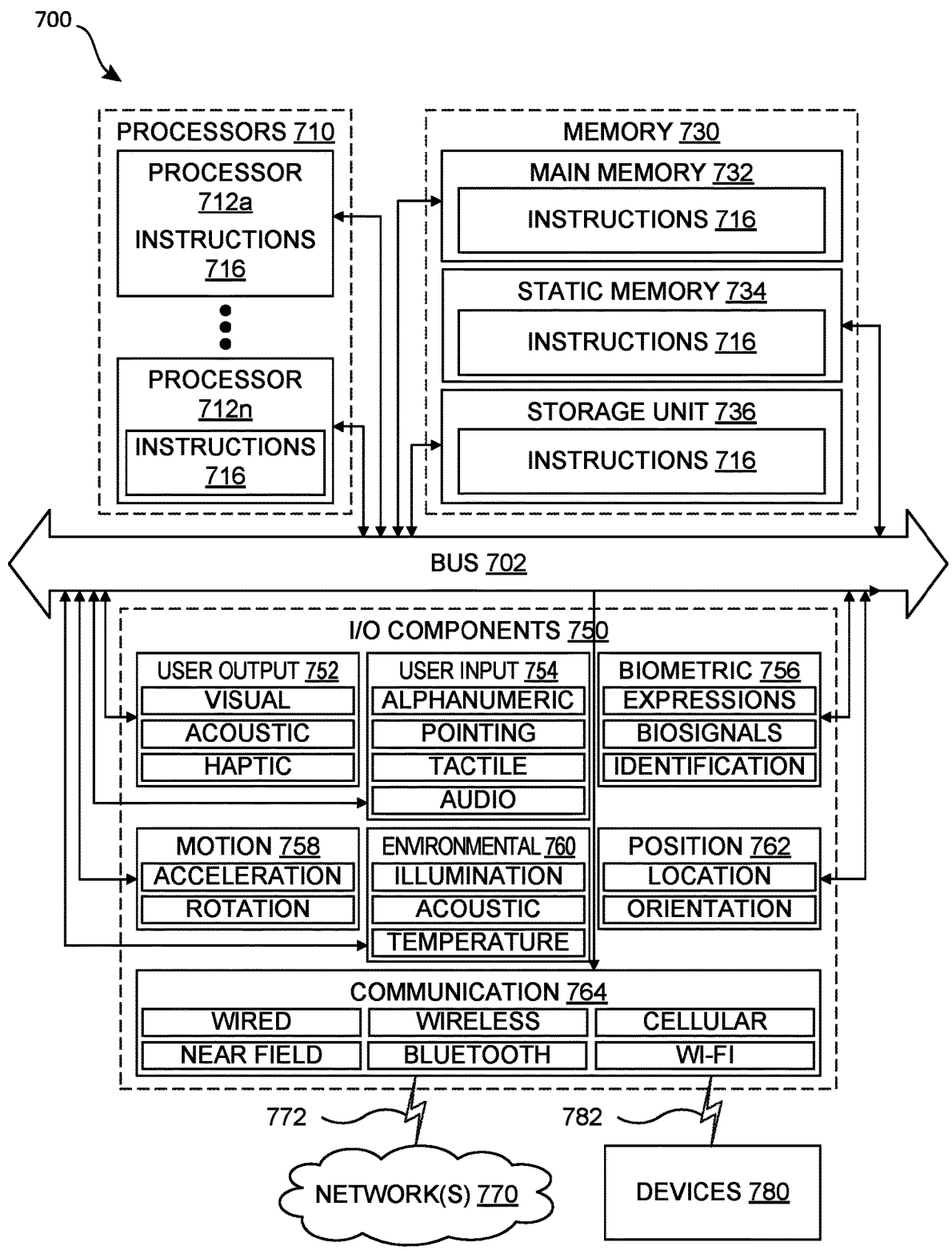
FIG. 7 is a block diagram showing components of an example machine configured to read instructions from a machine-readable medium and perform any of the features described herein.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement modules or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712a to 712n that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756, motion components 758, environmental components 760, and/or position components 762, among a wide array of other physical sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 758 may include, for example, acceleration sensors (for example, an accelerometer) and rotation sensors (for example, a gyroscope). The environmental components 760 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 762 may include, for example, location sensors (for example, a Global Position System (GPS) receiver), altitude sensors (for example, an air pressure sensor from which altitude may be derived), and/or orientation sensors (for example, magnetometers).

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 764, such as, but not limited to, geo-location via Internet Protocol (IP) address, location via Wi-Fi, cellular, NFC, Bluetooth, or other wireless station identification and/or signal triangulation.

In the following, further features, characteristics and advantages of the invention will be described by means of items:

Item 1. A method of identifying and evicting idle sessions for a cloud-based service, the method comprising:
training a machine learning model as a session classifying model to learn rules for classifying active sessions between clients and the cloud-based service, each of the active sessions pertaining to a document maintained by the cloud-based service, the session classifying model being trained to receive a plurality of parameters pertaining to the document associated with an active session as input and to apply the rules to the plurality of parameters to determine a classification for the active session and to provide an output indicative of the classification for the active session;
utilizing the session classifying model in the cloud-based service to classify the active sessions in the cloud-based service by providing the plurality of parameters pertaining to the document associated with each of the active sessions to the session classifying model and using the session classifying model to apply the rules to the plurality of parameters to determine classifications for each of the active sessions; and
evicting the active sessions from the cloud-based service that have been classified as idle sessions.

Item 2. The method of item 1, wherein the session classifying model is trained to determine whether the active session should be assigned an idle session classification or a less important session classification.

Item 3. The method of any of items 1-2, further comprising:
evicting the active sessions that have been classified as less important sessions.

Item 4. The method of any of items 1-3, wherein the plurality of parameters includes at least one parameter indicating a last time the document was modified and at least one parameter indicating a number of users involved in processing the document.

Item 5. The method of any of items 1-4, wherein the at least one parameter indicative of the last time the document was modified includes at least one of a time-since-last-call, a time-since-last-edit, a time-since-last-merge, a time-file-last-edit, and a time-file-created parameter, and
wherein the at least one parameter indicating the number of users involved in processing the document includes at least one of a number of active authors and a number of total authors.

Item 6. The method of any of items 1-5, wherein the plurality of parameters further includes at least one of a file type and a file size.

Item 7. The method of any of items 1-6, wherein the plurality of parameters includes a number of undo actions performed in the document.

Item 8. A data processing system comprising:
a processor; and
a memory in communication with the processor, the memory comprising executable instructions that, when executed by the processor, cause the data processing system to perform functions of:
utilizing a machine learning model trained as a session classifying model to assign classifications to active sessions between clients and a cloud-based service, each of the active sessions pertaining to a document maintained by the cloud-based service, the session classifying model receiving a plurality of parameters pertaining to the document associated with each of the active sessions as input and being to trained to apply rules for classifying each of the active sessions based on the plurality of parameters to determine classifications for the active sessions, the session classifying model providing outputs indicative of the classifications for the active sessions; and
evicting the active sessions from the cloud-based service that have been classified as idle sessions.

Item 9. The data processing system of item 8, wherein the session classifying model is trained to determine whether the active sessions should be assigned an idle session classification or a less important session classification.

Item 10. The data processing system of any of items 8-9, further comprising:
evicting the active sessions that have been classified as less important sessions.

Item 11. The data processing system of any of items 8-10, wherein the plurality of parameters includes at least one parameter indicating a last time the document was modified and at least one parameter indicating a number of users involved in processing the document.

Item 12. The data processing system of any of items 8-11, wherein the at least one parameter indicative of the last time the document was modified includes at least one of a time-since-last-call, a time-since-last-edit, a time-since-last-merge, a time-file-last-edit, and a time-file-created parameter, and
wherein the at least one parameter indicating the number of users involved in processing the document includes at least one of a number of active authors and a number of total authors.

Item 13. The data processing system of any of items 8-12, wherein the plurality of parameters further includes at least one of a file type and a file size.

Item 14. The data processing system of it any of items 8-em 13, wherein the plurality of parameters includes a number of undo actions performed in the document.

Item 15. The data processing system of any of items 8-14, wherein the functions further comprise:
  training the session classifying model to learn the rules for classifying the active sessions between the clients and the cloud-based service, the session classifying model being trained to receive the plurality of parameters pertaining to the document associated with an active session as input and to apply the rules to the plurality of parameters to determine the classification for the active session.

Item 16. A non-transitory computer readable medium on which are stored instructions that, when executed, cause a programmable device to perform functions of:
  utilizing a machine learning model trained as a session classifying model to assign classifications to active sessions between clients and a cloud-based service, each of the active sessions pertaining to a document maintained by the cloud-based service, the session classifying model receiving a plurality of parameters pertaining to the document associated with each of the active sessions as input and being to trained to apply rules for classifying each of the active sessions based on the plurality of parameters to determine classifications for the active sessions, the session classifying model providing outputs indicative of the classifications for the active sessions; and evicting the active sessions from the cloud-based service that have been classified as idle sessions.

Item 17. The non-transitory computer readable medium of item 16, wherein the session classifying model is trained to determine whether the active sessions should be assigned an idle session classification or a less important session classification.

Item 18. The non-transitory computer readable medium of any of items 16-17, wherein the functions further comprise:
  evicting the active sessions that have been classified as less important sessions.

Item 19. The non-transitory computer readable medium of any of items 16-18, wherein the plurality of parameters includes at least one parameter indicating a last time the document was modified and at least one parameter indicating a number of users involved in processing the document.

Item 20. The non-transitory computer readable medium of any of items 16-19, wherein the at least one parameter indicative of the last time the document was modified includes at least one of a time-since-last-call, a time-since-last-edit, a time-since-last-merge, a time-file-last-edit, and a time-file-created parameter, and
  wherein the at least one parameter indicating the number of users involved in processing the document includes at least one of a number of active authors and a number of total authors.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A method of identifying and evicting idle sessions for a cloud-based service, the method comprising:
   training a machine learning model as a session classifying model to learn rules for classifying active sessions between clients and the cloud-based service, each of the active sessions pertaining to a document maintained by the cloud-based service, the session classifying model being trained to receive a plurality of parameters pertaining to the document associated with an active session as input and to apply the rules to the plurality of parameters to determine a classification for the active session and to provide an output indicative of the classification for the active session;
   utilizing the session classifying model in the cloud-based service to classify the active sessions in the cloud-based service by providing the plurality of parameters pertaining to the document associated with each of the active sessions to the session classifying model and using the session classifying model to apply the rules to the plurality of parameters to determine classifications for each of the active sessions; and
   evicting the active sessions from the cloud-based service that have been classified as idle sessions,
   wherein the plurality of parameters includes at least one parameter indicating a last time the document was modified and at least one parameter indicating a number of users involved in processing the document,
   wherein the at least one parameter indicative of the last time the document was modified includes at least one of a time-since-last-call, a time-since-last-edit, a time-since-last-merge, a time-file-last-edit, and a time-file-created parameter, and
   wherein the at least one parameter indicating the number of users involved in processing the document includes at least one of a number of active authors and a number of total authors.

2. The method of claim 1, wherein the session classifying model is trained to determine whether the active session should be assigned an idle session classification or a less important session classification.

3. The method of claim 1, further comprising:
   evicting the active sessions that have been classified as less important sessions.

4. The method of claim 1, wherein the plurality of parameters further includes at least one of a file type and a file size.

5. The method of claim 4, wherein the plurality of parameters includes a number of undo actions performed in the document.

6. A data processing system comprising:
   a processor; and
   a memory in communication with the processor, the memory comprising executable instructions that, when executed by the processor, cause the data processing system to perform functions of:
   utilizing a machine learning model trained as a session classifying model to assign classifications to active sessions between clients and a cloud-based service, each of the active sessions pertaining to a document maintained by the cloud-based service, the session classifying model receiving a plurality of parameters pertaining to the document associated with each of the active sessions as input and being trained to apply rules for classifying each of the active sessions based on the plurality of parameters to determine classifications for the active sessions, the session classifying model providing outputs indicative of the classifications for the active sessions; and
   evicting the active sessions from the cloud-based service that have been classified as idle sessions,
   wherein the plurality of parameters includes at least one parameter indicating a last time the document was modified and at least one parameter indicating a number of users involved in processing the document,
   wherein the at least one parameter indicative of the last time the document was modified includes at least one of a time-since-last-call, a time-since-last-edit, a time-since-last-merge, a time-file-last-edit, and a time-file-created parameter, and
   wherein the at least one parameter indicating the number of users involved in processing the document includes at least one of a number of active authors and a number of total authors.

7. The data processing system of claim 6, wherein the session classifying model is trained to determine whether the active sessions should be assigned an idle session classification or a less important session classification.

8. The data processing system of claim 6, further comprising:
   evicting the active sessions that have been classified as less important sessions.

9. The data processing system of claim 6, wherein the plurality of parameters further includes at least one of a file type and a file size.

10. The data processing system of claim 9, wherein the plurality of parameters includes a number of undo actions performed in the document.

11. The data processing system of claim 6, wherein the functions further comprise:
    training the session classifying model to learn the rules for classifying the active sessions between the clients and the cloud-based service, the session classifying model being trained to receive the plurality of parameters pertaining to the document associated with an active session as input and to apply the rules to the plurality of parameters to determine a classification for the active session.

12. A non-transitory computer readable medium on which are stored instructions that, when executed, cause a programmable device to perform functions of:
    utilizing a machine learning model trained as a session classifying model to assign classifications to active sessions between clients and a cloud-based service, each of the active sessions pertaining to a document maintained by the cloud-based service, the session classifying model receiving a plurality of parameters pertaining to the document associated with each of the active sessions as input and being trained to apply rules for classifying each of the active sessions based on the plurality of parameters to determine classifications for the active sessions, the session classifying model providing outputs indicative of the classifications for the active sessions; and evicting the active sessions from the cloud-based service that have been classified as idle sessions, wherein the plurality of parameters includes at least one parameter indicating a last time the document was modified and at least one parameter indicating a number of users involved in processing the document, wherein the at least one parameter indicative of the last time the document was modified includes at least one of a time-since-last-call, a time-since-last-edit, a time-since-last-merge, a time-file-last-edit, and a time-file-created parameter, and wherein the at least one parameter indicating the number of users involved in processing the document includes at least one of a number of active authors and a number of total authors.

13. The non-transitory computer readable medium of claim 12, wherein the session classifying model is trained to determine whether the active sessions should be assigned an idle session classification or a less important session classification.

14. The non-transitory computer readable medium of claim 13, wherein the functions further comprise:

evicting the active sessions that have been classified as less important sessions.

\* \* \* \* \*